(12) United States Patent
Tan

(10) Patent No.: US 11,953,418 B2
(45) Date of Patent: Apr. 9, 2024

(54) DUST MONITORING METHOD, SYSTEM AND SIGNAL PROCESSING DEVICE

(71) Applicant: REACHCLEAN ENGINEERING AND TECHNICAL CHENGDU CO., LTD., Sichuan (CN)

(72) Inventor: Xianfeng Tan, Chengdu (CN)

(73) Assignee: Reachclean Engineering and Technical Chengdu Co., LTD, Sichuan (CN)

( * ) Notice: Subject to any disclaimer, the term of this patent is extended or adjusted under 35 U.S.C. 154(b) by 448 days.

(21) Appl. No.: 17/267,629

(22) PCT Filed: Jul. 31, 2019

(86) PCT No.: PCT/CN2019/098506
§ 371 (c)(1),
(2) Date: Sep. 5, 2021

(87) PCT Pub. No.: WO2020/034838
PCT Pub. Date: Feb. 20, 2020

(65) Prior Publication Data
US 2021/0404934 A1  Dec. 30, 2021

(30) Foreign Application Priority Data
Aug. 16, 2018  (CN) .......................... 201810935501.7

(51) Int. Cl.
*G01R 27/28* (2006.01)
*B01D 46/00* (2022.01)
(Continued)

(52) U.S. Cl.
CPC ..... *G01N 15/0656* (2013.01); *B01D 46/0086* (2013.01); *B01D 46/04* (2013.01);
(Continued)

(58) Field of Classification Search
CPC ......... G01N 1/2205; G01N 2015/0046; G01N 15/0656
See application file for complete search history.

(56) References Cited

U.S. PATENT DOCUMENTS

| 8,512,658 B2 * | 8/2013 | Eckhoff | F01N 13/009 60/299 |
| 2012/0260631 A1 * | 10/2012 | Winkler | F01N 3/0814 60/274 |

(Continued)

FOREIGN PATENT DOCUMENTS

| CN | 101732920 A | 6/2010 |
| CN | 201643914 U | 11/2010 |

(Continued)

OTHER PUBLICATIONS

First Office Action for Chinese Patent Application No. 201810935501.7 (CN ), dated Mar. 25, 2021, 12 pages.
(Continued)

*Primary Examiner* — Thang X Le
(74) *Attorney, Agent, or Firm* — Elliott, Ostrander & Preston, P.C.

(57) ABSTRACT

The invention discloses a dust detection method and system and a signal processing unit thereof to detect the dust in the net gas output by different gas-solid separation units. The method according to the invention comprises a signal acquisition section acquiring the target signal with the dust detection components arranged at the net gas output sides of different gas-solid separation units, a signal transmission section transmitting the target signal acquired by the signal acquisition section, and a signal processing section receiving and processing the target signal transmitted by the signal transmission section and outputting the detection results; the dust detection components of the signal acquisition section are arranged on the confluence channel that is connected with the net gas output sides of the different gas-solid separation units, and are respectively arranged behind the connection points on the confluence channel for connecting with the net gas output sides of the different gas-solid separation units.

15 Claims, 6 Drawing Sheets

(51) Int. Cl.
  *B01D 46/04* (2006.01)
  *B01D 46/44* (2006.01)
  *B01D 46/70* (2022.01)
  *G01N 1/22* (2006.01)
  *G01N 15/06* (2006.01)
  *G08B 21/18* (2006.01)

(52) U.S. Cl.
  CPC .......... *B01D 46/442* (2013.01); *B01D 46/70* (2022.01); *G01N 1/2205* (2013.01); *G08B 21/18* (2013.01)

(56) References Cited

U.S. PATENT DOCUMENTS

| | | | |
|---|---|---|---|
| 2013/0318948 A1* | 12/2013 | Van Marion | F02D 41/222 60/277 |
| 2018/0088018 A1* | 3/2018 | Inoue | G01N 15/0656 |
| 2018/0088082 A1* | 3/2018 | Inoue | F02D 41/1466 |

FOREIGN PATENT DOCUMENTS

| | | |
|---|---|---|
| CN | 103877801 A | 6/2014 |
| CN | 204008391 U | 12/2014 |
| CN | 104535466 A | 4/2015 |
| CN | 205269276 U | 6/2016 |
| CN | 205719879 U | 11/2016 |
| CN | 106405015 A | 2/2017 |
| CN | 206208862 U | 5/2017 |
| CN | 107643149 A | 1/2018 |
| CN | 110836839 B | 2/2022 |
| JP | 2010151554 A | 7/2010 |
| JP | 2013160617 A | 8/2013 |
| KR | 20020001983 A | 1/2002 |
| WO | 2020034838 A1 | 2/2020 |

OTHER PUBLICATIONS

Notification to Grant Patent Right for Invention for Chinese Patent Application No. 201810935501.7 (CN110836839A), dated Jan. 6, 2022, 2 pages.

Supplemental Search Report for Chinese Patent Application No. 201810935501.7 (CN110836839), dated Dec. 9, 2021, 1 page.

* cited by examiner

DUST MONITORING METHOD, SYSTEM AND SIGNAL PROCESSING DEVICE

FIELD OF THE INVENTION

The invention relates to the technical field of gas-solid separation, in particular to a dust detection method and system and a signal processing unit thereof for gas-solid separation process.

BACKGROUND OF THE INVENTION

In order to monitor the efficiency of gas-solid separation device (such as bag dust collector), which intercepts the dust in the gas flow with the filtering components (generally, the filtering components are subject to periodical back flushing by the back flushing control components to separate the dust from the filtering components so as to restore the air permeability), dust detection components are installed at the net gas output side of the separation device, so as to measure the dust concentration in the net gas output by the gas-solid separation device. When the dust concentration in the net gas output is found to be increased to a certain extent by the gas-solid separation device, it can be considered that the gas-solid separation device is out of order. Therefore, it is often necessary to inspect the filtering components in the gas-solid separation device for any problem in the filtering components, such as any damage that can cause dust leakage or poor sealing between the sealing components.

Suitable dust detection components are required to better monitor the efficiency of the gas-solid separation device. The Chinese patent No. CN107643149A "A System for Leakage Positioning and Fault Diagnosis of Dust Collector Bag" proposes a detector based on micro-charge principle as the dust detection component (refer to line 4, paragraph [0041], page 4 of the Description). In addition, the patent also provides the technology of combining the back flushing control with the dust detection components, so as to realize not only determination of any abnormal state of the filtering components in the gas-solid separation device, but also positioning of the abnormal filtering components in a certain range from the numerous filtering components of the gas-solid separation device, that is, the positioning technology of the abnormal filtering components.

The industrial gas-solid separation system often adopts several gas-solid separation devices as gas-solid separation units. In general, the net gas output sides of gas-solid separation units of such a gas-solid separation system are respectively connected with one confluence channel, so that the net gas output by these gas-solid separation units can be gathered and transmitted outward. If it is necessary to monitor the efficiency of each gas-solid separation unit, the current method is to install dust detection components on the net gas output ports of these gas-solid separation units or on the net gas transmission channels connected with the gas-solid separation channels. In short, the dust detection components are set before the confluence channel, so as to ensure that the net gas output side of each gas-solid separation unit has the corresponding dust detection components.

SUMMARY OF THE INVENTION

The purpose of the invention is to provide a dust detection method and system and a signal processing unit thereof to detect the dust in the net gas output by different gas-solid separation units.

To achieve the above purpose, the invention provides a dust detection method. The method comprises a signal acquisition section acquiring the target signal with the dust detection components arranged at the net gas output sides of different gas-solid separation units, a signal transmission section transmitting the target signal acquired by the signal acquisition section, and a signal processing section receiving and processing the target signal transmitted by the signal transmission section and output the detection results; the dust detection components of the signal acquisition section are arranged on the confluence channel that is connected with the net gas output sides of the different gas-solid separation units, and are respectively arranged behind the connection points on the confluence channel for connecting with the net gas output sides of the different gas-solid separation units.

Further, the different gas-solid separation units include at least three gas-solid separation units, the different gas-solid separation units and the connection points connected with the net gas output sides of the gas-solid separation units are arranged in sequence along the gas flow direction in the confluence channel.

Further, the dust detection components of the signal acquisition section include at least two dust detection components arranged in a spaced manner on the confluence channel and behind the most downstream connection points along the gas flow direction in the confluence channel.

Further, the cross section of the confluence channel includes, but is not limited to, a circular shape, and the channel length extends along a straight line.

Further, the confluence channel is arranged at one side of the gas-solid separation section consisting of the different gas-solid separation units.

Further, at least one of the different gas-solid separation units comprises at least two filters; the connection points on the confluence channel connected with the net gas output sides of the at least one gas-solid separation unit are respectively connected with the net gas output sides of the at least two filters.

Further, the at least one gas-liquid separation unit comprises filters arranged opposite on the left and right sides of the confluence channel; the connection points on the confluence channel connected with the net gas output sides of the at least one gas-solid separation unit include sub-connection points respectively connected with the net gas output sides of the filters arranged opposite on the left and right sides of the confluence channel.

Further, the cross-sectional area of the confluence channel increases along the gas flow direction in the confluence channel.

Further, the confluence channel is divided into different sections; the channel diameter of one section remains the same, and the channel diameter of different sections increases gradually along the gas flow direction in the confluence channel.

Further, the dust detection components near the connection between adjacent sections are arranged on the section with smaller channel diameter.

Further, valves are installed on each of the net gas transmission channel that is connected with the confluence channel for transmitting net gas thereto in the different gas-solid separation units.

Further, the dust detection components of the signal acquisition section take the electrical signal generated on the inductive probe of the dust detection components when the obtained dust particles in the gas flow pass the inductive probe as the target signal.

Further, the electrical signal includes at least one of the impact current signal generated on the inductive probe when the dust particles strike the inductive probe and the induced current signal generated on the inductive probe when the dust particles pass the inductive probe.

Further, the dust detection components named TRIBO manufactured by Auburn FilterSense LLC are used for the signal acquisition section.

Further, the signal processing procedures of the signal processing section include at least the first processing to determine whether the dust concentration in the net gas output by each different gas-solid separation unit shows any abnormal state according to the target signal provided by the signal transmission section and through preset strategy.

Further, the detection results output by the signal processing section are expressed as a notice that can direct to abnormal state of the related gas-solid separation unit when the dust concentration in the net gas output by at least one of the different gas-solid separation units is determined as in abnormal state through the first processing.

Further, each of the different gas-solid separation units achieves gas-solid separation by intercepting the dust in the gas flow with the filtering components, and implements periodic back flushing to the filter components with the back flushing control components to separate the dust from the filter components; therefore, the first processing determines whether the change in the dust concentration in net gas caused by back flushing of each of the different gas-solid separation units results in any abnormal state at least according to the information provided by the back flushing control components for expression of any back flushing of each gas-solid separation unit and the target signal provided by the signal transmission section and based on the preset strategy.

Further, the detection results output by the signal processing section are expressed as a notice that can direct to abnormal state of the filtering components in the related gas-solid separation unit when the first processing determines the change in the dust concentration in net gas caused by back flushing of at least one of the different gas-solid separation units as in abnormal state.

Further, at least one of the different gas-solid separation units comprises at least two gas-solid separation assemblies for periodic back flushing in sequence; if the gas-solid separation assembly is designated as the target assembly when any of the at least one of the gas-solid separation units is in a certain period after back flushing starts and the other gas-solid separation assemblies have not implemented back flushing, the detection results output by the signal processing section are expressed as a notice that can direct to abnormal state of the filtering components in the target assembly when the first processing determines the dust concentration in net gas output by the gas-solid separation unit comprising the target assembly as in abnormal state.

Further, the first processing determines whether the change in the dust concentration in net gas caused by back flushing of each of the different gas-solid separation units results in any abnormal state at least according to the information provided by the back flushing control components for expression of any back flushing of gas-solid separation units, the switch information of valves on the net gas transmission channels connected with the confluence channel and used for transmitting net gas thereto in the different gas-solid separation units and the target signal provided by the signal transmission section and based on the preset strategy.

Further, the preset strategy includes determining any abnormal state of the dust concentration in the net gas output by at least one of the different gas-solid separation units according to the target signal provided by the signal transmission section, and determining whether the abnormal state of the dust concentration in the net gas output by the at least one gas-solid separation unit is caused by the back flushing thereof at least according to the information provided by the back flushing control components for expression of any back flushing of gas-solid separation units.

Further, the preset strategy includes determining any abnormal state of the dust concentration in the net gas output by at least one of the different gas-solid separation units according to the target signal provided by the signal transmission section, and determining whether the abnormal state of the dust concentration in the net gas output by the at least one gas-solid separation unit is caused by the back flushing thereof at least according to the information provided by the back flushing control components for expression of any back flushing of gas-solid separation units and the switch information of valves on the net gas transmission channels connected with the confluence channel and used for transmitting net gas thereto in the different gas-solid separation units.

Further, the determination in the first processing of any abnormal state of the dust concentration in the net gas output by at least one of the different gas-solid separation units is made based on the correlated determination on the target signal acquired by the dust detection components related to the at least one gas-solid separation unit and the target signal acquired by the at least one dust detection component located at the upstream and/or downstream of the dust detection components related to the at least one gas-solid separation unit on the confluence channel.

Further, the correlated determination includes the first determination on compliance of the target signal acquired by the dust detection components related to the at least one gas-solid separation unit with the formulated requirements, the second determination on compliance of the target signal acquired by at least one dust detection component located at the downstream of the dust detection components related to the at least one gas-solid separation unit on the confluence channel with the formulated requirements, and the third determination on any abnormal state of the dust concentration in the net gas output by the at least one gas-solid separation unit based on the results of the first and second determinations; during the third determination, the positive determination results of the first and second determinations are used as the results of determination on the dust concentration in the net gas output by the at least one gas-solid separation unit as in certain abnormal state; the negative determination results of the first and second determinations are used as the results of determination on the dust concentration in the net gas output by the at least one gas-solid separation unit as in no abnormal state; in case of any conflict between the results of the first and second determinations, the analysis and determination results are made according to the preset analysis strategy.

Further, the preset strategy includes giving the analysis and determination results of certain or no abnormal state of the dust concentration in the net gas output by the at least one gas-solid separation unit when the second determination only includes the determination on whether the target signal acquired by one dust detection component complies with the formulated requirements, and giving the analysis and determination results of any abnormal state of the dust concentration in the net gas output by the at least one gas-solid separation unit according to the positive or negative results, whichever are more, of the first and second determinations when the second determination includes the determination on whether the target signal acquired by two or more dust detection components complies with the formulated requirements.

Further, the preset strategy also includes determining the dust detection components that acquire the target signal in conflict with the analysis and determination results as in fault state; the signal processing section outputs a notice that can direct to fault of the related dust detection components.

To achieve the above purpose, a further aspect of the invention provides a dust detection system. The system comprises a signal acquisition section used for acquiring the target signal with the dust detection components arranged at the net gas output sides of different gas-solid separation units, a signal transmission section used for transmitting the target signal acquired by the signal acquisition section, and a signal processing section used for receiving and processing the target signal transmitted by the signal transmission section and output the detection results; the dust detection components of the signal acquisition section are arranged on the confluence channel that is connected with the net gas output sides of the different gas-solid separation units, and are respectively arranged behind the connection points on the confluence channel for connecting with the net gas output sides of the different gas-solid separation units.

Further, the different gas-solid separation units include at least three gas-solid separation units, the different gas-solid separation units and the connection points connected with the net gas output sides of the gas-solid separation units are arranged in sequence along the gas flow direction in the confluence channel.

Further, the dust detection components of the signal acquisition section include at least two dust detection components arranged in a spaced manner on the confluence channel and behind the most downstream connection points along the gas flow direction in the confluence channel.

Further, the cross section of the confluence channel includes, but is not limited to, a circular shape, and the channel length extends along a straight line.

Further, the confluence channel is arranged at one side of the gas-solid separation section consisting of the different gas-solid separation units.

Further, at least one of the different gas-solid separation units comprises at least two filters; the connection points on the confluence channel connected with the net gas output sides of the at least one gas-solid separation unit are respectively connected with the net gas output sides of the at least two filters.

Further, the at least one gas-liquid separation unit comprises filters arranged opposite on the left and right sides of the confluence channel; the connection points on the confluence channel connected with the net gas output sides of the at least one gas-solid separation unit include sub-connection points respectively connected with the net gas output sides of the filters arranged opposite on the left and right sides of the confluence channel.

Further, the cross-sectional area of the confluence channel increases along the gas flow direction in the confluence channel.

Further, the confluence channel is divided into different sections; the channel diameter of one section remains the same, and the channel diameter of different sections increases gradually along the gas flow direction in the confluence channel.

Further, the dust detection components near the connection between adjacent sections are arranged on the section with smaller channel diameter.

Further, valves are installed on each of the net gas transmission channel that is connected with the confluence channel for transmitting net gas thereto in the different gas-solid separation units.

Further, the dust detection components of the signal acquisition section take the electrical signal generated on the inductive probe of the dust detection components when the obtained dust particles in the gas flow pass the inductive probe as the target signal.

Further, the electrical signal includes at least one of the impact current signal generated on the inductive probe when the dust particles strike the inductive probe and the induced current signal generated on the inductive probe when the dust particles pass the inductive probe.

Further, the dust detection components named TRIBO manufactured by Auburn FilterSense LLC are used for the signal acquisition section.

Further, the signal processing procedures of the signal processing section include at least the first processing to determine whether the dust concentration in the net gas output by each different gas-solid separation unit shows any abnormal state according to the target signal provided by the signal transmission section and through preset strategy.

Further, the detection results output by the signal processing section are expressed as a notice that can direct to abnormal state of the related gas-solid separation unit when the dust concentration in the net gas output by at least one of the different gas-solid separation units is determined as in abnormal state through the first processing.

Further, each of the different gas-solid separation units achieves gas-solid separation by intercepting the dust in the gas flow with the filtering components, and implements periodic back flushing to the filter components with the back flushing control components to separate the dust from the filter components; therefore, the first processing determines whether the change in the dust concentration in net gas caused by back flushing of each of the different gas-solid separation units results in any abnormal state at least according to the information provided by the back flushing control components for expression of any back flushing of each gas-solid separation unit and the target signal provided by the signal transmission section and based on the preset strategy.

Further, the detection results output by the signal processing section are expressed as a notice that can direct to abnormal state of the filtering components in the related gas-solid separation unit when the first processing determines the change in the dust concentration in net gas caused by back flushing of at least one of the different gas-solid separation units as in abnormal state.

Further, at least one of the different gas-solid separation units comprises at least two gas-solid separation assemblies for periodic back flushing in sequence; if the gas-solid separation assembly is designated as the target assembly when any of the at least one of the gas-solid separation units is in a certain period after back flushing starts and the other gas-solid separation assemblies have not implemented back flushing, the detection results output by the signal processing section are expressed as a notice that can direct to abnormal state of the filtering components in the target assembly when the first processing determines the dust concentration in net gas output by the gas-solid separation unit comprising the target assembly as in abnormal state.

Further, the first processing determines whether the change in the dust concentration in net gas caused by back flushing of each of the different gas-solid separation units results in any abnormal state at least according to the information provided by the back flushing control components for expression of any back flushing of gas-solid separation units, the switch information of valves on the net gas transmission channels connected with the confluence channel and used for transmitting net gas thereto in the different gas-solid separation units and the target signal provided by the signal transmission section and based on the preset strategy.

Further, the preset strategy includes determining any abnormal state of the dust concentration in the net gas output by at least one of the different gas-solid separation units according to the target signal provided by the signal transmission section, and determining whether the abnormal state of the dust concentration in the net gas output by the at least one gas-solid separation unit is caused by the back flushing thereof at least according to the information provided by the back flushing control components for expression of any back flushing of gas-solid separation units.

Further, the preset strategy includes determining any abnormal state of the dust concentration in the net gas output by at least one of the different gas-solid separation units according to the target signal provided by the signal transmission section, and determining whether the abnormal state of the dust concentration in the net gas output by the at least one gas-solid separation unit is caused by the back flushing thereof at least according to the information provided by the back flushing control components for expression of any back flushing of gas-solid separation units and the switch information of valves on the net gas transmission channels connected with the confluence channel and used for transmitting net gas thereto in the different gas-solid separation units.

Further, the determination in the first processing of any abnormal state of the dust concentration in the net gas output by at least one of the different gas-solid separation units is made based on the correlated determination on the target signal acquired by the dust detection components related to the at least one gas-solid separation unit and the target signal acquired by the at least one dust detection component located at the upstream and/or downstream of the dust detection components related to the at least one gas-solid separation unit on the confluence channel.

Further, the correlated determination includes the first determination on compliance of the target signal acquired by the dust detection components related to the at least one gas-solid separation unit with the formulated requirements, the second determination on compliance of the target signal acquired by at least one dust detection component located at the downstream of the dust detection components related to the at least one gas-solid separation unit on the confluence channel with the formulated requirements, and the third determination on any abnormal state of the dust concentration in the net gas output by the at least one gas-solid separation unit based on the results of the first and second determinations; during the third determination, the positive determination results of the first and second determinations are used as the results of determination on the dust concentration in the net gas output by the at least one gas-solid separation unit as in certain abnormal state; the negative determination results of the first and second determinations are used as the results of determination on the dust concentration in the net gas output by the at least one gas-solid separation unit as in no abnormal state; in case of any conflict between the results of the first and second determinations, the analysis and determination results are made according to the preset analysis strategy.

Further, the preset strategy includes giving the analysis and determination results of certain or no abnormal state of the dust concentration in the net gas output by the at least one gas-solid separation unit when the second determination only includes the determination on whether the target signal acquired by one dust detection component complies with the formulated requirements, and giving the analysis and determination results of any abnormal state of the dust concentration in the net gas output by the at least one gas-solid separation unit according to the positive or negative results, whichever are more, of the first and second determinations when the second determination includes the determination on whether the target signal acquired by two or more dust detection components complies with the formulated requirements.

Further, the preset strategy also includes determining the dust detection components that acquire the target signal in conflict with the analysis and determination results as in fault state; the signal processing section outputs a notice that can direct to fault of the related dust detection components.

In conclusion, the above dust detection system according to the invention has the arrangements necessary for implementing any of the methods for dust detection according to the invention.

To achieve the above purpose, the invention further provides a signal processing unit for the dust detection system. The unit comprises at least one processor, at least one memory and computer program instructions stored therein. The computer program instructions are executed by the processor to implement the procedures handled by the signal processing section as described in any of the above methods for dust detection according to the invention.

In the above dust detection method and system and the signal processing unit according to the invention, the dust detection components of the signal acquisition section are arranged on a confluence channel that is connected with the net gas output sides of the different gas-solid separation units, and are respectively arranged behind the connection points on the confluence channel for connecting with the net gas output sides of the different gas-solid separation units based on inventiveness. Therefore, the conditions (such as concentration change) of the dust in the net gas output by each of the different gas-solid separation units can be detected by the related dust detection components. More importantly, the gas flow is in more regular movement in the confluence channel, and the homogeneity of the dust is higher in the confluence channel. Therefore, it is easier for the dust detection components to acquire more real target signal, so as to improve the accuracy of dust detection.

The invention is further described in combination with the drawings and the embodiments. Additional aspects and advantages of the invention are given in the following description, some of which will become apparent from the following description, or will be known through the practice of the invention.

BRIEF DESCRIPTION OF THE DRAWINGS

The drawings forming part of the invention are used to help with the understanding of the invention, and the contents provided in the drawings and the related descriptions in the invention can be used to explain the invention and do not constitute an improper limitation of the invention. Among the drawings.

DETAILED DESCRIPTION OF THE PREFERRED EMBODIMENTS

The invention is clearly and completely described in combination with the drawings as follows. A person skilled in the art can implement the invention based on the description. In prior to any description of the invention in combination with the drawings, it should be noted that:

The technical scheme and technical features provided in each part, including the following description, of the invention can be combined with each other under the premise of no conflict.

In addition, the embodiments described as follows are part, not all, of the embodiments of the invention. Therefore, based on the embodiments of the invention, all other embodiments obtained by those skilled in the art without creative work shall fall within the protection scope of the invention.

Terms and units used in the invention: "include", "comprise", "have" used in the Description, Claims and the related part of the invention and any of their variations shall cover a non-exclusive inclusion. "Gas-solid separation" in the invention means the separation of gas and solid particles therein. In addition, other terms and units used in the invention can be interpreted in a reasonable manner based on the related contents of the invention.

Figure 1:
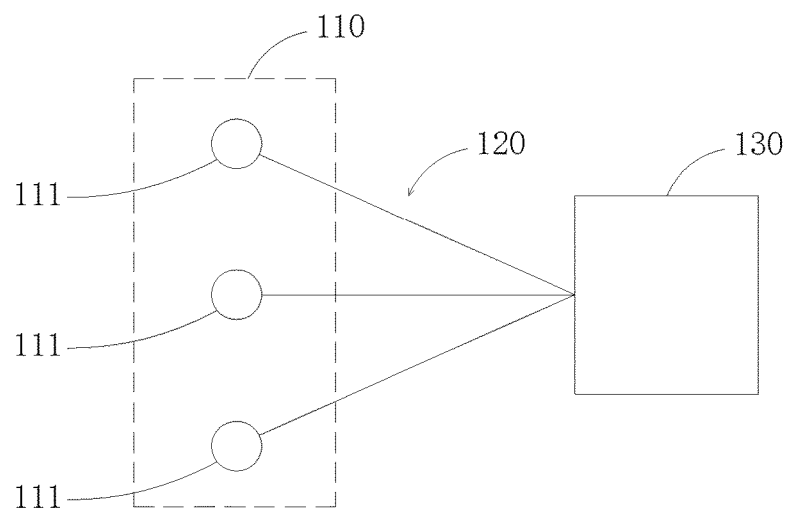
FIG. 1 is a schematic diagram illustrating the connection between the signal acquisition section and the signal processing section in an embodiment of the dust detection system according to the invention.

FIG. 1 is a schematic diagram illustrating the connection between the signal acquisition section and the signal processing section in an embodiment of the dust detection system according to the invention. As shown in FIG. 1, the dust detection system according to the invention comprises a signal acquisition section 110, a signal transmission section 120 and a signal processing section 130; in which, the signal acquisition section 110 is used to acquire the target signal through the dust detection components 111 on the net gas output sides of different gas-solid separation units, the signal transmission section 120 is used to transmit the target signal acquired by the signal acquisition section 110, and the signal processing section 130 is used to receive the target signal transmitted by the signal transmission section 120, process the signal and output the detection results.

Figure 2:
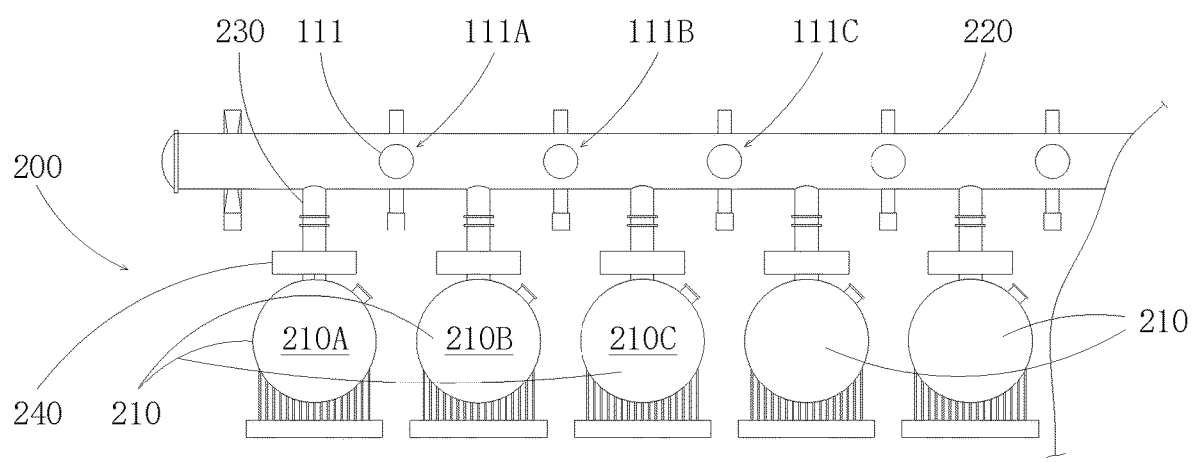
FIG. 2 is a schematic diagram illustrating the arrangement of the dust detection components in an embodiment of the dust detection system according to the invention.

FIG. 2 is a schematic diagram illustrating the arrangement of the dust detection components in an embodiment of the dust detection system according to the invention. As shown in FIG. 1 and FIG. 2, the dust detection components 111 of the signal acquisition section 110 in the dust detection system according to the invention are specifically arranged on a confluence channel 220 that is connected with the net gas output sides of the different gas-solid separation units 210, and are respectively arranged behind the connection points on the confluence channel 220 for connecting with the net gas output sides of the different gas-solid separation units 210.

In which, the different gas-solid separation units 210 comprise at least two, generally more than three, gas-solid separation units 210. Such gas-solid separation units 210 can be units that achieve gas-solid separation through any of the gas-solid separation methods. Currently, there are numerous existing gas-solid separation methods, including some commonly seen ones such as gravity dust collection, cyclone dust collection, electric dust collection, bag dust collection, dust collection with ceramic filter core and with metal filter core.

The confluence channel 220 is a net gas header in a regular structure with a cross section in circular or rectangular shape. However, the confluence channel 220 may also be designed in a non-regular structure due to the diversified design of gas-solid separation systems. For example, in a gas-solid separation system including multiple bag dust collectors, each bag dust collector acts as a gas-solid separation unit. One side of the bag dust collector is provided with a rectangular cross-section and extends forward. These bag dust collectors are arranged on the outside of the channel along the length direction thereof, and there is a partition plate in the channel to divide the channel into two layers. The lower layer is connected with the raw gas input side of each bag dust collector as the raw gas input channel ("raw gas" means the gas to be subject to gas-solid separation), while the upper layer is connected with the net gas output side of each bag dust collector as the confluence channel 220. In addition, the partition plate tilts to form a certain angle to the horizontal plane, so as to make the cross-sectional area of the raw gas input channel decrease along the raw gas input direction, and the cross-sectional area of the confluence channel 220 increase along the net gas output direction. Apparently, the confluence channel 220 is in a non-regular structure.

The description or limitation of "the dust detection components 111 of the signal acquisition section 110 in the dust detection system according to the invention are specifically arranged on a confluence channel 220 that is connected with the net gas output sides of the different gas-solid separation units 210, and are respectively arranged behind the connection points on the confluence channel 220 for connecting with the net gas output sides of the different gas-solid separation units 210" is mentioned above. Such description or limitation can be interpreted as: Dust detection components 111 are arranged between any adjacent connection points (specifically, the connection points connected with the gas-solid separation units 210) on the confluence channel 220; however, only one dust detection component 111 can be arranged between any adjacent connection points on the confluence channel 220.

An example of arranging more than one dust detection component 111 between any adjacent connection points on the confluence channel 220: Two dust detection components 111 are arranged between the adjacent connection points on the confluence channel 220 in consideration of redundancy design. Therefore, it can be considered that the two dust detection components correspond to one of gas-solid separation units 210.

In addition, it is possible that more than two dust detection components may appear to be arranged between any adjacent connection points on the confluence channel 220, but they are actually still one dust detection component. For example, if a dust detection component needs to combine more than two sensor probes to acquire the target signal, the two sensor probes are still one dust detection component in nature even if the two sensor probes are respectively installed at different positions between any adjacent connection points on the confluence channel 220.

In the dust detection system according to the invention, the dust detection components 111 of the signal acquisition section preferably take the electrical signal generated on the inductive probe of the dust detection components when the obtained dust particles in the gas flow pass the inductive probe as the target signal. Based on the current existing dust detection technologies in the gas-solid separation field, the above dust detection components feature relatively high accuracy, and are applicable to the dust detection system according to the invention. The detector based on microcharge principle used in the prior art referred in the "Background of the Invention" in the Description also belongs to such dust detection components.

Such dust detection components are mainly divided into the following specific types: ones taking the impact current signal generated on the inductive probe when the dust particles in the gas flow strike the inductive probe as the target signal; ones taking the induced current signal generated on the inductive probe when the dust particles in the gas flow pass the inductive probe as the target signal; and ones taking both the impact current signal and induced current signal as the target signal.

The TRIBO manufactured by Auburn FilterSense LLC can be used for the above dust detection components. Auburn system LLC, the predecessor of Auburn FilterSense LLC, was a leading and outstanding supplier of the above dust detection components as well as the development and application of the supporting technologies.

Of course, the dust detection components 111 of the signal acquisition section do not necessarily only take the electrical signal generated on the inductive probe of the dust detection components when the obtained dust particles in the gas flow pass the inductive probe as the target signal. Despite the different principles of different dust detection components, higher homogeneity of gas and solid flow to be detected and of dust distribution is always conducive to improving the accuracy of dust detection.

In the dust detection system according to the invention, the signal transmission section 120 can adopt all applicable data transmission methods. However, in order to avoid interference as much as possible, it is recommended to connect the signal output port of the signal acquisition section 110 with the signal input port of the signal processing section 130 through an anti-interference signal line.

In the dust detection system according to the invention, the signal processing section 130 can be composed of signal processing units which are independently and respectively connected with each dust detection component 111, or a signal processing unit connected with each dust detection component 111 at the same time. The signal processing unit is generally configured as a user terminal that has necessary hardware and software.

In addition, the signal acquisition section 110, the signal transmission section 120 and the signal processing section 130 of the dust detection system according to the invention can be integrated or partially integrated.

The dust detection system according to the invention is used to implement such dust detection method, which comprising a signal acquisition section 110 acquiring the target signal with the dust detection components 111 arranged at the net gas output sides of different gas-solid separation units 210, a signal transmission section 120 transmitting the target signal acquired by the signal acquisition section 110, and a signal processing section 130 receiving and processing the target signal transmitted by the signal transmission section 120 and output the detection results.

Generally, in the dust detection method according to the invention, the signal processing procedures of the signal processing section 130 include at least the first processing to determine whether the dust concentration in the net gas output by each different gas-solid separation unit 210 shows any abnormal state according to the target signal provided by the signal transmission section 120 and through preset strategy.

The detection results output by the signal processing section 130 can be expressed as a notice that can direct to abnormal state of the related gas-solid separation unit 210 when the dust concentration in the net gas output by at least one of the different gas-solid separation units 210 is determined as in abnormal state through the first processing. The notice can be an alarm or notice that direct to abnormal state of the related gas-solid separation units 210.

If each of the different gas-solid separation units 210 (bag dust collection units, dust collection units with ceramic filter core, etc.) achieves gas-solid separation by intercepting the dust in the gas flow with the filtering components, and implements periodic back flushing to the filter components with the back flushing control components to separate the dust from the filter components, in consideration of significantly higher dust concentration in net gas, as mentioned in CN107643149A referred to in the "Background of the Invention" in the Description, will be caused by the back flushing under abnormal condition of filtering components in the gas-solid separation units 210, the first processing can determine whether the change in the dust concentration in net gas caused by back flushing of each of the different gas-solid separation units results in any abnormal state at least according to the information provided by the back flushing control components for expression of any back flushing of each gas-solid separation unit and the target signal provided by the signal transmission section and based on the preset strategy.

The detection results output by the signal processing section can also be expressed as a notice that can direct to abnormal state of the filtering components in the related gas-solid separation unit when the first processing determines the change in the dust concentration in net gas caused by back flushing of at least one of the different gas-solid separation units as in abnormal state.

In the above system and dust detection method according to the invention, the dust detection components 111 of the signal acquisition section 110 are arranged on a confluence channel 220 that is connected with the net gas output sides of the different gas-solid separation units 210, and are respectively arranged behind the connection points on the confluence channel 220 for connecting with the net gas output sides of the different gas-solid separation units 210. Therefore, dust detection components 111 are arranged between any adjacent connection points on the confluence channel 220 and any of the dust detection component 111 corresponds to the gas-solid separation units 210 connected with the connection point located at the upstream of the adjacent connection points related to the dust detection components 111, so that the conditions (such as concentration change) of the dust in the net gas output by each of the different gas-solid separation units 210 can be detected by the related dust detection components 111.

In addition, the gas flow is in more regular movement in the confluence channel 220, and the homogeneity of the dust is higher in the confluence channel 220, so it is easier for the dust detection components to acquire more real target signal on the confluence channel 220, so as to improve the accuracy of dust detection.

It is known from the "Background of the Invention" in the Description, the dust detection components are arranged before the confluence channel in the prior art. However, the inventor of the invention has found that the length of the net gas transmission channel between the gas-solid separation unit and the confluence channel is generally short and subject to direction change, which leads to irregular gas flow. In addition, the dust not separated from net gas cannot fully diffuse in the net gas transmission channel between the gas-solid separation unit and the confluence channel, resulting in heterogeneous dust distribution in the net gas transmission channel between the gas-solid separation unit and the confluence channel. Therefore, the detection accuracy may be low if the dust detection components are arranged on the net gas transmission channel between the gas-solid separation unit and the confluence channel.

An embodiment of the dust detection system according to the invention and the dust detection method to implement the embodiment are further described in combination with FIGS. 1, 2, 4 and 5 as follows.

As shown in FIG. 2, the gas-solid separation system 200 comprises a plurality of gas-solid separation units 210 in a row, each of which is used as a bag dust collector (with back flushing function).

One side of the gas-solid separation unit composed of these gas-solid separation units 210 is provided with a net gas header extending in a straight line along the arrangement direction of the gas-solid separation units 210 and serving as the confluence channel 220. The gas-solid separation units 210 (the gas-solid separation unit 210A, gas-solid separation unit 210B and gas-solid separation unit 210C along the gas flow direction in the confluence channel 220) are connected with the confluence channel 220 through the respective net gas transmission channels 230.

One end of each net gas transmission channel 230 is connected with the net gas output end of any of the corresponding gas-solid separation units 210, and the other end is connected with the confluence channel 220 (the connection positions are the connection points on the confluence channel 220 respectively for connecting with the net gas output side of the gas-solid separation units 210). In addition, valves 240 are arranged on each net gas transmission channel 230.

As shown in FIG. 2, the above gas-solid separation units 210 and the connection points connected with the net gas output side of the gas-solid separation units are arranged in sequence along the gas flow direction in the confluence channel 220.

The basic operating process of the gas-solid separation system 200 is as follows:

Firstly, the raw gas ("raw gas" means the gas to be subject to gas-solid separation) enters each of gas-solid separation units 210 and is filtered through the filtering bag. The filtered net gas enters into the confluence channel 220 after passing through each net gas transmission channel 230 (the valves 240 on each net gas transmission channel 230 are open at the time), and then is output through the confluence channel 220.

Then, off-line dust collection is carried out to each of gas-solid separation units 210 in turn. The steps of off-line dust collection for one of gas-solid separation units 210 include:

Closing the valve 240 on the net gas transmission channel 230 of the gas-solid separation unit 210A under the instruction of the back flushing control components;

Charging back flushing gas flow into the gas-solid separation unit 210A with the back flushing device under the instruction of the back flushing control components, so that the dust can be separated from the filtering bag by the back flushing gas flow;

After the back flushing is finished, stopping charging back flushing gas flow into the gas-solid separation unit 210A with the back flushing device under the instruction of the back flushing control components;

Then, opening the valves 240 on the net gas transmission channel 230 of the gas-solid separation unit 210A under the instruction of the back flushing control components;

Finally, restoring the gas-solid separation unit 210A to the original filtration state.

After that, repeating these steps to the gas-solid separation unit 210B, gas-solid separation unit 210C, etc.

As shown in FIG. 1 and FIG. 2, the gas-solid separation system 200 is provided with a dust detection system, which includes a signal acquisition section 110, a signal transmission section 120 and a signal processing section 130; wherein, a plurality of dust detection components 111 of the signal acquisition section 110 are arranged on the confluence channel 220 in FIG. 2 and are respectively arranged behind the connection points on the confluence channel 220 for connecting with the net gas output sides of each bag dust collector.

Along the gas flow direction in the confluence channel 220, the dust detection components 111 include the dust detection component 111A, dust detection component 111B, dust detection component 111C, etc. Among them, the dust detection component 111A corresponds to the gas-solid separation unit 210A, the dust detection component 111B corresponds to the gas-solid separation unit 210B, and the dust detection component 111C corresponds to the gas-solid separation unit 210C, and so on.

Figure 4:
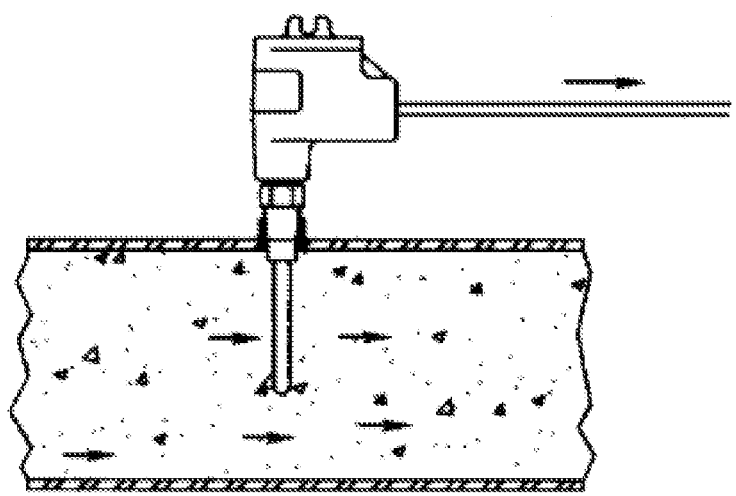
FIG. 4 is a schematic diagram illustrating the construction of the dust detection components in an embodiment of the dust detection system according to the invention.

FIG. 4 is a schematic diagram illustrating the construction of the dust detection components in an embodiment of the dust detection system according to the invention. The dust detection components 111 adopt the dust detection components as shown in FIG. 4.

The dust detection components 111 take the impact current signal generated on the inductive probe when the obtained dust particles in the gas flow strike the inductive probe as the target signal. Specifically, the dust detection components named TRIBO manufactured by Auburn FilterSense LLC are used.

As shown in FIG. 4, the inductive probes of the dust detection components 111 are inserted into the confluence channel 220.

Figure 5:
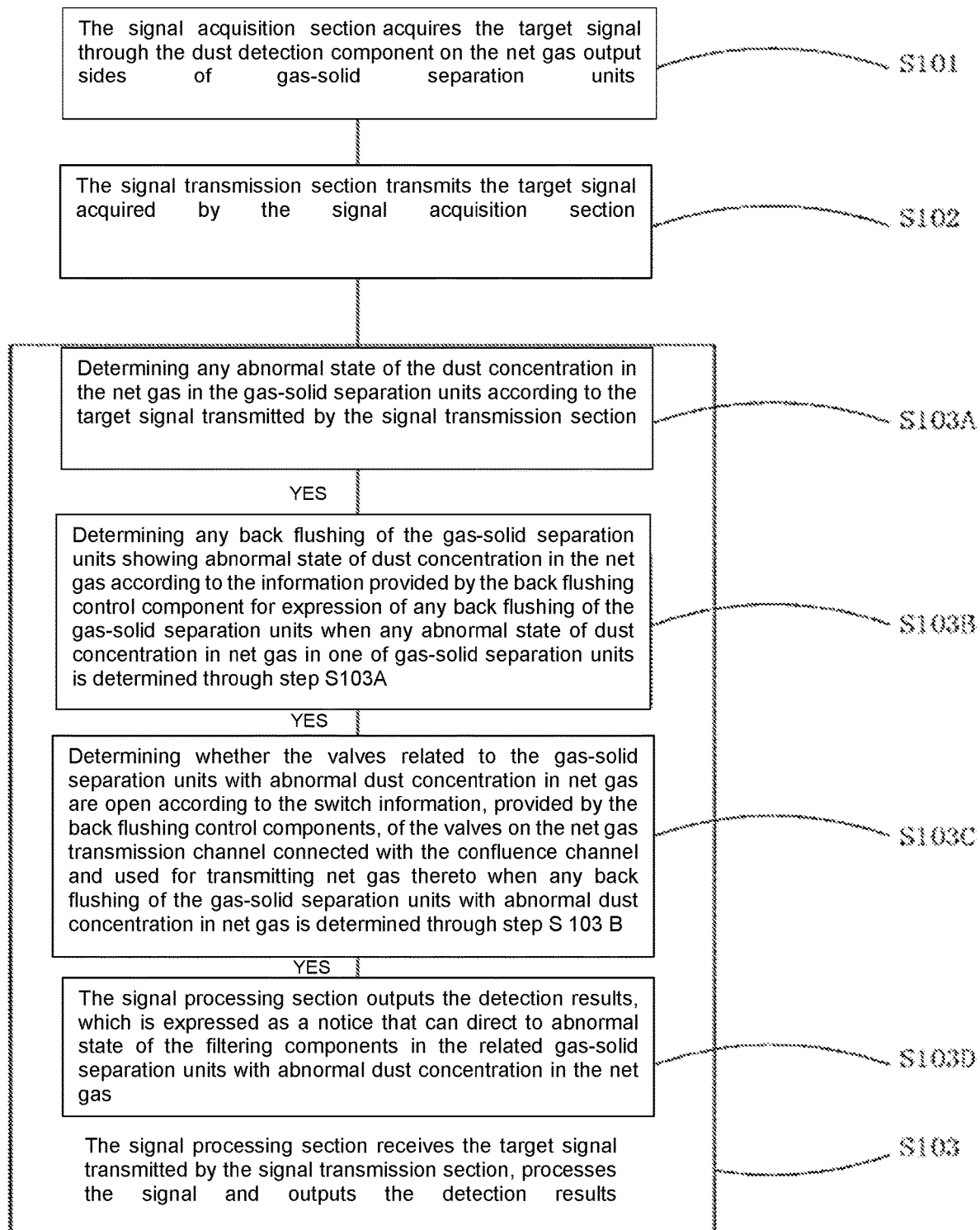
FIG. 5 is a schematic diagram illustrating the process of an embodiment of the dust detection method according to the invention.

FIG. 5 is a schematic diagram illustrating the process of an embodiment of the dust detection method according to the invention. As shown in FIG. 5, the following dust detection method implemented based on the dust detection system comprises:

Step S101: the signal acquisition section 110 acquires the target signal through the dust detection component 111 on the net gas output sides of gas-solid separation units 210.

Step S102: the signal transmission section 120 transmits the target signal acquired by the signal acquisition section 110.

Step S103: the signal processing section 130 receives the target signal transmitted by the signal transmission section 120, processes the signal and outputs the detection results.

Wherein, the step S103 specifically includes:

Step S103A: determining any abnormal state of the dust concentration in the net gas in the gas-solid separation units 210 according to the target signal transmitted by the signal transmission section 120.

For this step, since the dust detection components 111 are arranged between any adjacent connection points on the confluence channel 220, and any dust detection component 111 corresponds to the gas-solid separation units 210 connected with the connection point located at the upstream of the adjacent connection points related to the dust detection component 111 (the dust detection component 111A corresponds to the gas-solid separation unit 210A, the dust detection component 111B corresponds to the gas-solid separation unit 210B, the dust detection component 111C corresponds to the gas-solid separation unit 210C, and so on), so that the change of dust concentration in the net gas output by each of gas-solid separation units 210 can be obtained by the corresponding dust detection component 111, so as to realize the detection of the abnormal state of dust concentration in the net gas.

It is apparent that the target signal acquired by the dust detection component 111A can determine any abnormal state of the dust concentration in the net gas in the gas-solid separation unit 210A.

Any abnormal state of the dust concentration in the net gas in the gas-solid separation unit 210B can be determined according to the target signal acquired by the dust detection component 111B. It should be noted that, although the abnormal state of dust concentration in the net gas in the gas-solid separation unit 210A has certain impact on the target signal acquired by the dust detection component 111B, the impact will be reduced due to the diluted dust in the net gas output by the gas-solid separation unit 210A as the net gas output by the gas-solid separation unit 210A converges with that output by the gas-solid separation unit 210B in the pipeline in front of the dust detection component 111B in the confluence channel 220. Therefore, it is possible to determine any abnormal state of dust concentration in the net gas in the gas-solid separation unit 210B according to the target signal acquired by the dust detection component 111B.

Similarly, the target signal acquired by the dust detection component 111C can determine any abnormal state of the dust concentration in the net gas in the gas-solid separation unit 210C.

In view of the correspondence between the gas-solid separation units 210 and the dust detection components 111 and the arrangement mode of the dust detection components 111 on the confluence channel 220, additional measures can be taken to further ensure the accuracy of determination of any abnormal state of dust concentration in net gas in the gas-solid separation units 210 according to the target signal transmitted by the signal transmission section 120.

The additional measures can be determining any abnormal state of the dust concentration in the net gas output by one of gas-solid separation units 210 based on the correlated determination on the target signal acquired by the dust detection components 111 related to the gas-solid separation units 210 and the target signal acquired by at least one dust detection component 111 located at the upstream and/or downstream of the dust detection components 111 related to the gas-solid separation units 210 on the confluence channel 220. This will be further described in the next embodiment of the invention.

Step S103B: determining any back flushing of the gas-solid separation units 210 showing abnormal state of dust concentration in the net gas according to the information provided by the back flushing control component for expression of any back flushing of the gas-solid separation units 210 when any abnormal state of dust concentration in net gas in one of gas-solid separation units 210 is determined through step S103A.

In this step, the signal processing section 130 needs to receive the information provided by the back flushing control component for expression of any back flushing of the gas-solid separation units 210, so as to determine any back flushing of the gas-solid separation units 210 with abnormal dust concentration in net gas.

Step S103C: determining whether the valves 240 related to the gas-solid separation units 210 with abnormal dust concentration in net gas are open according to the switch information, provided by the back flushing control components, of the valves 240 on the net gas transmission channel connected with the confluence channel 220 and used for transmitting net gas thereto when any back flushing of the gas-solid separation units 210 with abnormal dust concentration in net gas is determined through step S103B.

According to the switch information, provided by the back flushing control components, of the valves 240 on the net gas transmission channel connected with the confluence channel 220 and used for transmitting net gas thereto, if the valves 240 corresponding to the gas-solid separation units 210 with abnormal dust concentration in net gas are open within the set time before the abnormal state of dust concentration in the net gas occurs in the gas-solid separation units 210, it is indicated that the abnormal state of dust concentration in net gas output by the gas-solid separation units 210 is caused by the back flushing of the gas-solid separation units 210 itself.

Step S103D: when the abnormal state of dust concentration in net gas output by the gas-solid separation unit 210s is determined to be caused by back flushing of the gas-solid separation units 210 based on the fact that the valves 240 related to the gas-solid separation units 210 with abnormal dust concentration in net gas are open as determined through step S103C, the signal processing section 130 outputs the detection results, which is expressed as a notice that can direct to abnormal state of the filtering components in the related gas-solid separation units 210 with abnormal dust concentration in the net gas.

An embodiment of the dust detection system according to the invention and the dust detection method to implement the embodiment are further described in combination with FIGS. 1, 3 and 6 as follows.

Figure 3:
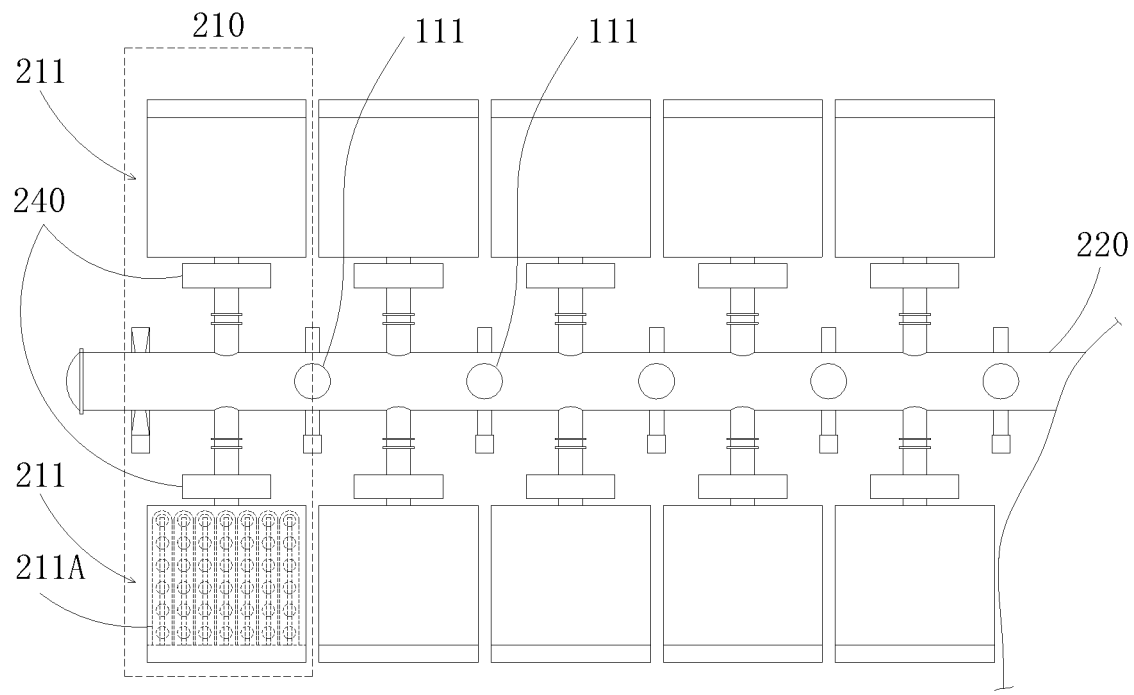
FIG. 3 is a schematic diagram illustrating the arrangement of the dust detection components in an embodiment of the dust detection system according to the invention.

As shown in FIG. 3, the gas-solid separation system comprises a plurality of gas-solid separation units 210 (refer to the dotted box marked with 210) in a row, each of which includes two filters 211. Each filter 211 is used as a bag dust collector.

Each bag dust collector is equipped with multiple groups of gas-solid separation assemblies 211A. Each group of gas-solid separation assemblies 211A includes a plurality of filtering bags and back flushing devices that can simultaneously carry out pulse back flushing and dust collection to these filtering bags. The multiple groups of gas-solid separation assemblies 211A in each bag dust collector carry out pulse back flushing and dust collection successively in sequence.

In the middle of the gas-solid separation section composed of these gas-solid separation units 210, there is a net gas header extending in a straight line along the arrangement direction of the gas-solid separation units 210 and serving as the confluence channel 220. The two filters 211 of each of gas-solid separation units 210 are arranged on the left and right sides of the confluence channel 220.

The connection points on the confluence channel 220 connected with the net gas output sides of any of the gas-solid separation units 210 include the sub-connection points that are respectively connected with the net gas output sides of the two filters 211 of the gas-solid separation units 210. Valves 240 are arranged on the net gas transmission channel between each sub-connection point and the corresponding filter 211.

In addition, the cross-sectional area of the confluence channel 220 increases gradually (not shown in the figure) along its gas flow direction (from left to right in FIG. 3), so that the cross-sectional area of the confluence channel 220 increases as the inflow of more net gas, thus maintaining the pressure and flow velocity in the confluence channel 220 in a relatively consistent range.

Specifically, for convenience of manufacturing, the confluence channel 220 is divided into different sections; the channel diameter of one section remains the same, and the channel diameter of different sections increases gradually along the gas flow direction in the confluence channel. The connection between adjacent pipe sections are preferably close to the midpoint between adjacent connection points respectively connected with the net gas output sides of two adjacent gas-solid separation units 210 on the confluence channel 220.

The basic operating process of the gas-solid separation system is as follows:

Firstly, the raw gas enters two filters 211 of each of gas-solid separation units 210 and is filtered through the filtering bag. The filtered net gas enters into the confluence channel 220 after passing through each net gas transmission channel (the valves 240 on each net gas transmission channel are open at the time), and then is output through the confluence channel 220.

Then, on-line dust collection is carried out to each of gas-solid separation units 210 in turn. The steps of on-line dust collection for one of gas-solid separation units 210 include:

One group of gas-solid separation assemblies 211A of one filter 211 in the most upstream one of gas-solid separation units 210 on the confluence channel 220 are instructed by the back flushing control components to charge pulse back flushing gas flow into the gas-solid separation assemblies 211A, so that the pulse back flushing gas flow performs dust collection by pulse back flushing to each filtering bag in the gas-solid separation assemblies 211A, thus separating the dust from the filtering bag;

After completion of dust collection by pulse back flushing to the gas-solid separation assemblies 211A, the back flushing control components instruct the back flushing devices of another group of gas-solid separation assemblies 211A to repeat the above process, so as to perform dust collection by pulse back flushing to all gas-solid separation assemblies 211A of one filter 211, and then, to another filter 211 of the gas-solid separation units 210.

After completion of dust collection by pulse back flushing to two filters 211 in one of gas-solid separation units 210, other gas-solid separation units 210 are subject to on-line dust collection.

As shown in FIG. 1 and FIG. 3, dust detection system is installed in the gas-solid separation system. The dust detection system includes a signal acquisition section 110, a signal transmission section 120 and a signal processing section 130. Wherein, a plurality of dust detection components 111 of the signal acquisition section 110 are arranged on the confluence channel 220 in FIG. 3 and are respectively arranged behind the connection points on the confluence channel 220 for connecting with the net gas output sides of each of gas-solid separation units 210.

In the dust detection system according to the embodiment, two dust detection components 111 are arranged in a spaced manner on the confluence channel 220 and behind the most downstream connection points along the gas flow direction in the confluence channel 220.

The dust detection components 111 in the dust detection system according to the embodiment are the same as those used in the previous embodiment.

In addition, the dust detection components 111 near the connection between adjacent sections are preferably arranged on the section with smaller channel diameter, so as to ensure higher accuracy of the target signal acquired by the dust detection components 111.

Figure 6:
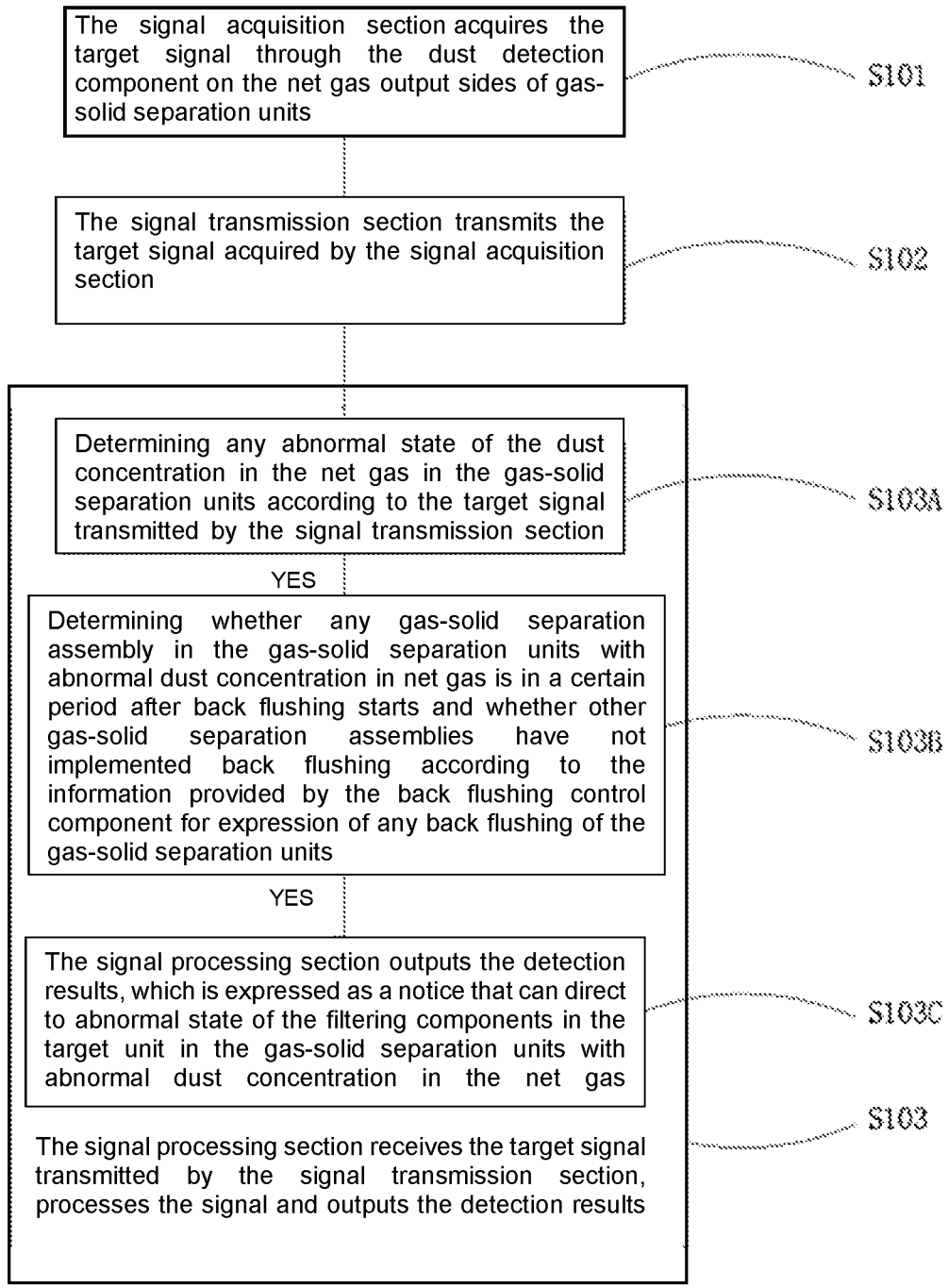
FIG. 6 is a schematic diagram illustrating the process of an embodiment of the dust detection method according to the invention.

FIG. 6 is a schematic diagram illustrating the process of an embodiment of the dust detection method according to the invention. As shown in FIG. 6, the following dust detection method implemented based on the dust detection system comprises:

Step S101: the signal acquisition section 110 acquires the target signal through the dust detection component 111 on the net gas output sides of each of gas-solid separation units 210.

Step S102: the signal transmission section 120 transmits the target signal acquired by the signal acquisition section 110.

Step S103: the signal processing section 130 receives the target signal transmitted by the signal transmission section 120, processes the signal and outputs the detection results.

Wherein, the step S103 specifically includes:

Step S103A: determining any abnormal state of the dust concentration in the net gas in the gas-solid separation units 210 according to the target signal transmitted by the signal transmission section 120.

The determination of any abnormal state of the dust concentration in the net gas output by any of gas-solid separation units 210 (hereinafter referred to as the "target unit") is made based on the correlated determination on the target signal acquired by the dust detection components 111 related to the target unit and the target signal acquired by at least one dust detection component 111 located at the downstream of the dust detection components 111 related to the target unit on the confluence channel 220.

Specifically, if the target unit is not the most downstream one of the gas-solid separation units 210, the determination of any abnormal state of the dust concentration in the net gas output by the target unit is made based on the correlated determination on the target signal acquired by the dust detection components 111 related to the target unit and the target signal acquired by two dust detection components 111 located at the downstream of the dust detection components 111 related to the target unit on the confluence channel 220. Also, the dust detection components 111 corresponding to the target unit and the two dust detection components 111 on the confluence channel 220 located at downstream of the target unit, i.e., a total of three dust detection components 111, are arranged adjacent to each other in sequence.

If the target unit is the most downstream one of the gas-solid separation units 210, the determination of any abnormal state of the dust concentration in the net gas output by the target unit is made based on the correlated determination on the target signal acquired by the dust detection components 111 related to the target unit and the target signal acquired by one dust detection component 111 located at the downstream of the dust detection components 111 related to the target unit on the confluence channel 220.

Figure 7:
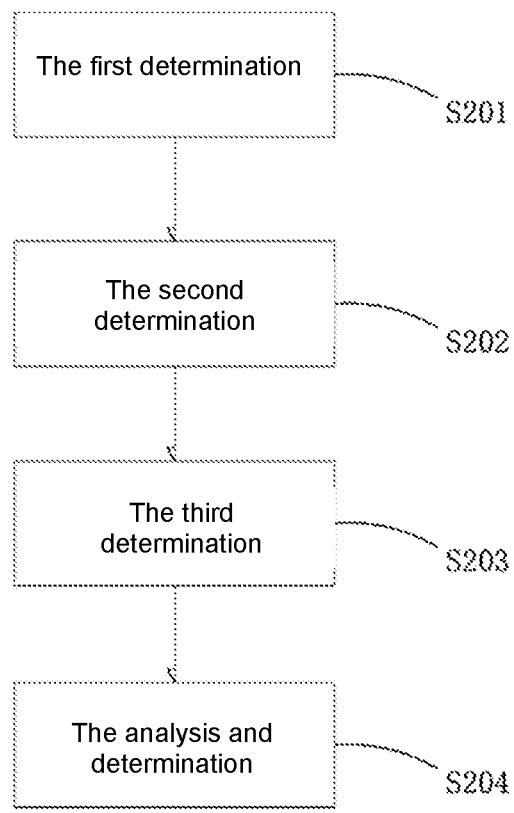
FIG. 7 is a schematic diagram illustrating the correlated determination process of an embodiment of the dust detection method according to the invention.

FIG. 7 is a schematic diagram illustrating the correlated determination process of an embodiment of the dust detection method according to the invention. As shown in FIG. 7, the correlated determination specifically include (taking the target unit not being the most downstream of gas-solid separation units 210 as an example):

Step S201: performing the first determination on whether the target signal acquired by the dust detection components 111 related to the target unit complies with the formulated requirements.

Step S202: performing the second determination on whether the target signal acquired by two dust detection components 111 located at the downstream of the dust detection components 111 related to the target unit on the confluence channel 220 complies with the formulated requirements.

Step S203: performing the third determination on any abnormal state of the dust concentration in net gas output by the target unit based on the results of the first and the second determination.

During the third determination, the positive determination results of the first and second determinations are used as the results of determination on the dust concentration in the net gas output by the target unit as in certain abnormal state; the negative determination results of the first and second determinations are used as the results of determination on the dust concentration in the net gas output by the target unit as in no abnormal state; in case of any conflict between the results of the first and second determinations, the step S204 is to be performed, and the analysis and determination results are made according to the preset analysis strategy.

Step S204: giving the analysis and determination results of any abnormal state of the dust concentration in the net gas output by the target unit according to the positive or negative results, whichever are more, of the first and second determinations.

Figure 8:
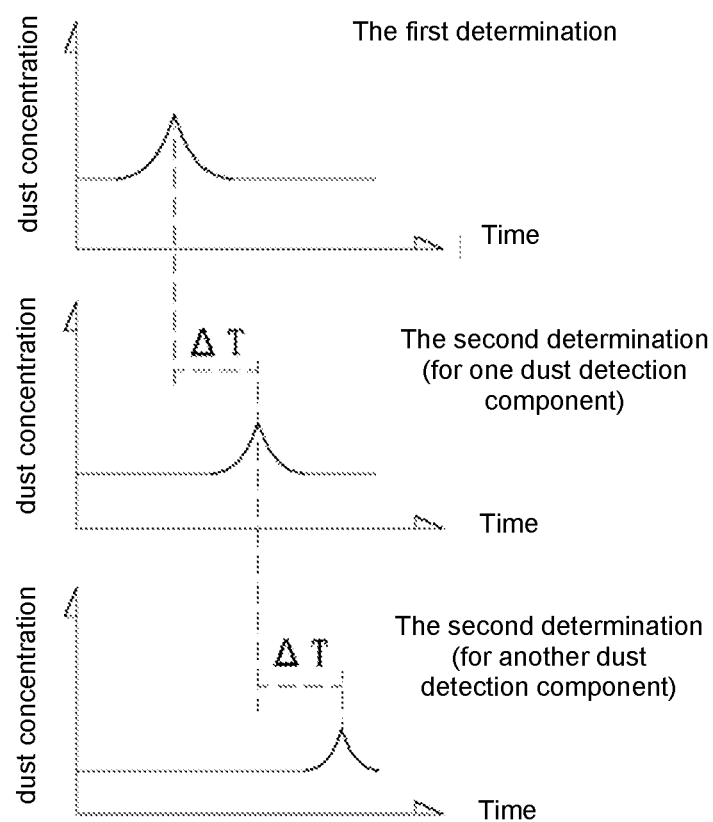
FIG. 8 is a schematic diagram illustrating the correlated determination principle of an embodiment of the dust detection method according to the invention.

For example, as shown in FIG. 8, during the first determination, the target signal acquired by the dust detection component 111 related to the target unit is represented as a curve (the uppermost one in FIG. 8) with time as the horizontal coordinate and dust concentration as the vertical coordinate. A peak appearing in the curve is interpreted as a sudden increase in the dust concentration, and if the peak exceeds a set threshold value, the result of the first determination is positive ("Yes") (otherwise the result is negative ("No")), specifically indicating that the target signal acquired by the dust detection component 111 related to the target unit complies with the formulated requirements. During the second determination, the target signal acquired by a dust detection component 111 adjacent to the above dust detection component 111 is represented as a curve (the middle one in FIG. 8) with time as the horizontal coordinate and dust concentration as the vertical coordinate. A peak appearing in the curve is interpreted as a sudden increase in dust concentration, which is after the time of the peak appearing in the uppermost curve in FIG. 8. The interval time between the two peaks is indicated as $\Delta T$. If the peak value in the curve in the middle of FIG. 8 exceeds the set threshold value and the interval time $\Delta T$ is within a reasonable range (i.e., the difference from the experience time that dust passes through the two dust detection components 111 is within a certain range), the determination result is positive ("Yes"); similarly, it can be determined whether the target signal acquired by the dust detection components 111 complies with the formulated requirements.

The results of the first and second determinations, if all or both are positive, are used as the analysis and determination results of any abnormal state of the dust concentration in the net gas output by the target unit. Otherwise, they are used as the analysis and determination results of no abnormal state of the dust concentration in the net gas output by the target unit.

The above step S204 may also includes determining the dust detection components that acquire the target signal in conflict with the analysis and determination results as in fault state. Therefore, the signal processing section 130 outputs a notice that can direct to fault of the related dust detection components.

As shown in FIG. 6, the following steps need to be performed to determine any abnormal state of the dust concentration in the net gas in one of gas-solid separation units 210 in step S103A:

Step S103B: determining whether any gas-solid separation assembly 211A in the gas-solid separation units 210 with abnormal dust concentration in net gas is in a certain period after back flushing starts and whether other gas-solid separation assemblies 211A have not implemented back flushing according to the information provided by the back flushing control component for expression of any back flushing of the gas-solid separation units 210.

If the gas-solid separation assembly 211A is designated as the target assembly any one of the gas-solid separation units 210 is in a certain period after back flushing starts and the other gas-solid separation assemblies 211A have not implemented back flushing, the step S103B is actually used to determine on any target assembly existing in the gas-solid separation units 210 with abnormal dust concentration in net gas.

Step S103C: determining that the abnormal state of dust concentration in net gas output by the gas-solid separation units 210 is caused by back flushing of the target unit in the gas-solid separation units 210 based on the fact that target unit exists in the gas-solid separation units 210 with abnormal dust concentration in net gas through step S103B. The signal processing section 130 outputs the detection results, which is expressed as a notice that can direct to abnormal state of the filtering components in the target unit in the gas-solid separation units with abnormal dust concentration in the net gas.

The above dust detection method according to the invention can be implemented using the signal processing unit of the dust detection system. The unit comprises at least one processor, at least one memory and computer program instructions stored therein. The computer program instructions are executed by the processor to implement the procedures handled by the signal processing section as described in FIG. 5 or 6.

The processor can include a central processing unit (CPU), an application special integrated circuit (ASIC), or one or more integrated circuit that can be configured to implement the method according to the invention.

The memory can include a high-capacity memory used for data or instruction. For example, without limitation, the memory can include hard disk drive (HDD), soft disk drive, flash memory, optical disk, magnetic optical disk or universal serial bus (USB) drive or a combination of the above two or more items.

Suitably, the memory 520 can include removable or non-removable (or fixed) media. Suitably, the memory can be arranged inside or outside the data processing unit. In a specific embodiment, the memory is a non-volatile solid state memory.

In a specific embodiment, the memory includes a read-only memory (ROM). Suitably, the ROM can be a mask ROM, programmable ROM (PROM), erasable programmable ROM (EPROM), electrically erasable programmable ROM (EEPROM), electrically-alterable ROM (EAROM) or flash memory, or a combination of two or more of the above.

The processor implements the dust detection method described above by reading and executing the computer program instructions stored in the memory.

In an embodiment, the signal processing unit may also include a communication interface and a bus. Wherein, the processor, memory and communication interface are connected and complete communication with each other via the bus.

The communication interface is mainly used to achieve communication between the relevant parts in the embodiments of the invention. The bus includes hardware, software, or both, for coupling the components of the load balancing device to each other.

For example, without limitation, the bus may include an accelerated graphics port (AGP) or other graphics bus, an enhanced industry standard architecture (EISA) bus, a front-side bus (FSB), a hyper-transport (HT) interconnection, an industry standard architecture (ISA) bus, an unlimited bandwidth interconnection, a low pin count (LPC) bus, a memory bus, a micro-channel architecture (MCA) bus, a peripheral component interconnection (PCI) bus, PCI-Express (PCI-X) bus, serial advanced technology attachment (SATA) bus, Video Electronics Standards Association local (VLB) bus, or other suitable bus, or a combination of two or more of above.

Where suitable, the bus may include one or more buses. Although specific bus is described and shown in the invention, any suitable bus or interconnection is considered in the invention.

The above is a description of the invention. A person skilled in the art can implement the invention based on the description. Based on the above description of the invention, all other embodiments and examples obtained by those skilled in the art without creative work shall fall within the scope of protection of the invention.

The invention claimed is:

1. A dust detection method, comprising the following steps:
   a signal acquisition section acquires a target signal through a plurality of dust detection components on net gas output sides of a plurality of different gas-solid separation units;
   a signal transmission section transmits the target signal acquired by the signal acquisition section;
   a signal processing section receives the target signal transmitted by the signal transmission section, processes the target signal and outputs a detection results;
   the plurality of dust detection components of the signal acquisition section are arranged on a confluence channel that is connected with the net gas output sides of the plurality of different gas-solid separation units, and are respectively arranged behind a plurality of connection points on the confluence channel for connecting with the net gas output sides of the plurality of different gas-solid separation units.

2. The dust detection method according to claim 1, wherein the plurality of different gas-solid separation units include at least three gas-solid separation units; the plurality of different gas-solid separation units and the plurality of connection points connected with the net gas output sides of the plurality of gas-solid separation units are arranged in sequence along a gas flow direction in the confluence channel.

3. The dust detection method according to claim 1, wherein a cross section of the confluence channel includes a circular shape, and a channel length extends along a straight line.

4. The dust detection method according to claim 1, wherein at least one of the plurality of different gas-solid separation units comprises at least two filters; the connection points on the confluence channel connected with the net gas output sides of the at least one gas-solid separation unit are respectively connected with a net gas output side of the at least two filters.

5. The dust detection method according to claim 1, wherein a cross-sectional area of the confluence channel increases along a gas flow direction in the confluence channel.

6. The dust detection method according to claim 5, wherein the confluence channel is divided into a plurality of different sections, each of the different sections having a channel diameter, wherein; the channel diameter of each section is constant, and the channel diameter of different sections increases gradually along a gas flow direction in the confluence channel.

7. The dust detection method according to claim 6, wherein the dust detection components near a connection between adjacent different sections are arranged on a section having a smaller channel diameter.

8. The dust detection method according to claim 1, wherein the valves are installed on each of the net gas transmission channel that is connected with the confluence channel for transmitting net gas thereto in the plurality of different gas-solid separation units.

9. The dust detection method according to claim 1, wherein the plurality of dust detection components of the signal acquisition section emit an electrical signal generated on an inductive probe of the plurality of dust detection components when obtained dust particles in the gas flow pass the inductive probe as the target signal.

10. The dust detection method according to claim 9, wherein the electrical signal includes at least one of an impact current signal generated on the inductive probe when the dust particles strike the inductive probe and an induced current signal generated on the inductive probe when the dust particles pass the inductive probe.

11. The dust detection method according to claim 1, wherein the signal processing procedures of the signal processing section include at least a first processing to determine whether a dust concentration in the net gas output by each different gas-solid separation unit shows any abnormal state according to the target signal provided by the signal transmission section and through preset strategy.

12. The dust detection method according to claim 11, wherein the detection results output by the signal processing section are expressed as a notice that can direct to abnormal state of the related gas-solid separation unit when the dust concentration in the net gas output by at least one of the different gas-solid separation units is determined as in abnormal state through the first processing.

13. A dust detection system, comprising a signal acquisition section used for acquiring a target signal with a plurality of dust detection components arranged at net gas output sides of different gas-solid separation units, a signal transmission section used for transmitting the target signal acquired by the signal acquisition section, and a signal processing section used for receiving and processing the target signal transmitted by the signal transmission section and outputting detection results, and wherein the plurality of dust detection components of the signal acquisition section are arranged on a confluence channel that is connected with the net gas output sides of the different gas-solid separation units, and are respectively arranged behind connection points on the confluence channel for connecting with the net gas output sides of the different gas-solid separation units.

14. The dust detection system according to claim 13, wherein the different gas-solid separation units include at least three gas-solid separation units; the different gas-solid separation units and the connection points connected with the net gas output sides of the gas-solid separation units are arranged in sequence along a gas flow direction in the confluence channel.

15. A signal processing unit, comprising at least one processor, at least one memory and computer program instructions stored therein, and wherein the computer program instructions are executed by the processor to implement the procedures handled by the signal processing section as described in the dust detection method according to claim 1.

* * * * *